United States Patent [19]

Aoyagi et al.

[11] 4,400,981

[45] Aug. 30, 1983

[54] METHOD AND APPARATUS FOR DETECTING ABNORMAL CONDITIONS OF SWITCH GEARS

[75] Inventors: Akira Aoyagi; Kazuomi Sakata; Shinichi Ikeda; Mashiro Koyama, all of Yokohama, Japan

[73] Assignee: Tokyo Shibaura Denki Kabushiki Kaisha, Kanagawa, Japan

[21] Appl. No.: 315,889

[22] Filed: Oct. 28, 1981

[30] Foreign Application Priority Data

Oct. 31, 1980 [JP] Japan ................................. 55-153204

[51] Int. Cl.³ .......................... G01D 9/38; G01L 5/22
[52] U.S. Cl. ............................. 73/862.51; 73/862.54
[58] Field of Search ........... 73/862.54, 862.53, 862.51, 73/862.01, 9, 789, 862.38, 862.19; 340/644

[56] References Cited

U.S. PATENT DOCUMENTS

| 3,033,495 | 5/1962 | Sikora | 73/862.54 X |
| 3,396,516 | 8/1968 | Anderson | 73/862.19 |
| 4,058,178 | 11/1977 | Shinohara et al. | 73/862.54 X |
| 4,274,438 | 6/1981 | LaCoste | 73/9 X |

Primary Examiner—Charles A. Ruehl
Attorney, Agent, or Firm—Oblon, Fisher, Spivak, McClelland & Maier

[57] ABSTRACT

A method and apparatus for detecting an abnormal condition of a switch gear device including a switch gear, for instance a circuit breaker driven by an operating device. A device for detecting the operating force applied from the operating device to the circuit breaker is mounted between the operating device and the circuit breaker. Data is obtained from the detecting device, expanded in time for analysis, and compared with data obtained under a normal state to judge the presence or absence of an abnormal condition within the switch gear.

10 Claims, 6 Drawing Figures

METHOD AND APPARATUS FOR DETECTING ABNORMAL CONDITIONS OF SWITCH GEARS

BACKGROUND OF THE INVENTION

1. Field of the Invention

This invention generally relates to a method and apparatus for detecting abnormal conditions or faults of a switch gear, for instance a gas insulated switch gear from outside thereof, and more particularly to a method and apparatus for detecting abnormal mechanical conditions relating to operation of the switch gear.

About 90% of the faults of a switch gear are mechanical faults such as leakage of air, gas or oil, fracture, failure or improper operation of the switch gear itself or it's operating mechanism.

Leakage of air, gas or oil can be detected with a pressure relay to produce an alarm signal whereas an inoperable state or improper operation can not be detected until such faults actually occur. The reason is, in most cases, various elements of the circuit breaker do not move during steady state after closing, but the elements move as desired only when a fault occurs on a power circuit.

The method and apparatus for detecting in advance abnormal conditions of switch gear is disclosed in copending application Ser. No. 246,061, filed Mar. 20, 1981, for A. Aoyagi and S. Ikeda. With the recent increase in power demand, the operating voltage and capacity of the switch gear increases year by year and any fault or abnormal condition thereof results in even more serious problems.

SUMMARY OF THE INVENTION

Accordingly, it is an object of this invention to provide a new and improved method and apparatus for readily detecting abnormal conditions or faults in switch gear before they actually occur.

Another object of this invention is to provide a new and improved method and apparatus for directly detecting an operating force when a switch gear is operated by beforehand connecting a load cell to a communicating portion of the operating force, whereby abnormal conditions of the switch gear can be detected readily and with high sensitivity.

According to one aspect of this invention, there is provided a method of detecting an abnormal condition of a switch gear device operated by an actuating device, including the steps of connecting a detecting means to a portion between the switch gear and the actuating device; driving a movable portion of the switch gear device by the actuating device; concurrently measuring the output from the detecting means; recording the measured output from the detecting means; and comparing the recorded measured output from the detecting means with an output obtained under a normal state.

According to another aspect of this invention, there is provided an apparatus for detecting an abnormal condition of a switch gear device including a movable contact contained in a sealed casing filled with insulating gas and an actuating mechanism for actuating the movable contact with a predetermined drive force. The apparatus includes a detecting unit mounted between the movable contact and the actuating mechanism and recording means coupled to the detecting unit for recording the output of the detecting unit upon actuation of the switch gear by the actuating mechanism. The recording means includes means for reading out data at a slow speed and displaying means coupled to the recording means for displaying recorded data for analysis.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
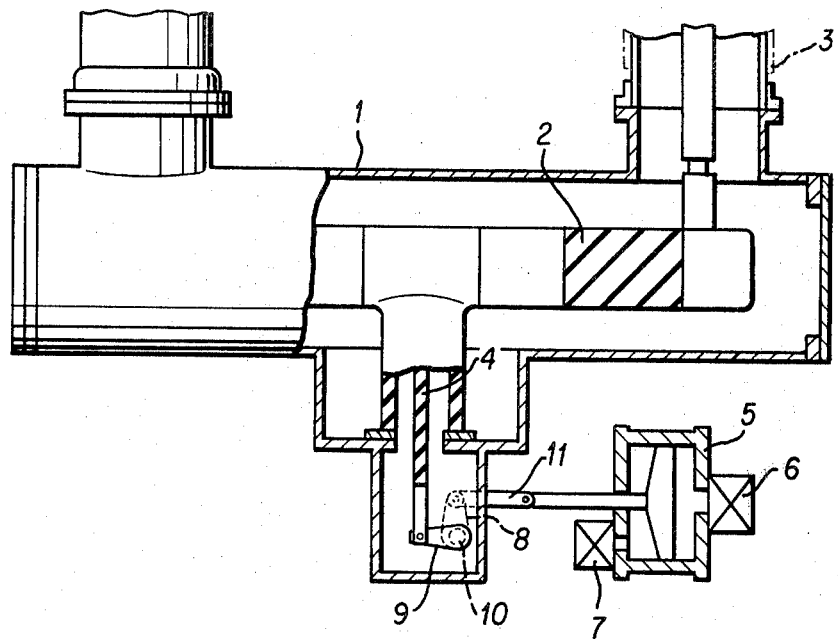
FIG. 1 is a schematic representation, partly in section, of a typical tank type gas circuit breaker to which the invention is applicable.

Referring now to the drawings, wherein like reference numerals and letters designate identical or corresponding parts throughout the several views, and more particularly to FIG. 1, a gas vessel 1 of a tank type gas circuit breaker is shown filled with an insulating gas such as sulfur hexafluoride ($SF_6$) and containing therein a circuit breaker 2 of well known construction. Insulation bushings 3 are mounted on the gas vessel 1 for passing lead conductors connected to an electric power circuit, not shown.

The circuit breaker 2 is operated by an operating cylinder 5 disposed on the outside of the gas vessel 1 via an insulating rod 4, and crank levers 8 and 9 pivoted at a pin 10. The pin 10 air tightly extends through the lower casing of vessel 1 and crank lever 8 is connected to one end of pin 10 on the outside of the casing.

The operating cylinder 5 which is connected with lever 8 via a rod is provided with control valves 6 and 7 for admitting and discharging pressurized fluid into and out of the cylinder.

The mechanical reliability of a circuit breaker has been tested in accordance with a provision of the Japanese Electrotechnical Committee (JEC)-181, 1975 or by repeating 10,000 times the opening and closing operations.

As is well known in the art, with these tests, contact opening time, stroke of the movable contact, contact closing time, operating voltage, etc., are measured simultaneously. Furthermore, with regard to the operating voltage, gas pressure and control voltage, etc., tests are made not only under rated values but also under maximum and minimum values. Combinations of these values are also defined in JEC-181 so that the maker of a circuit breaker performs tests thereof under the combination before shipping to confirm the reliability of the circuit breaker.

However, as the circuit breaker is required to operate at a high speed, it requires a strong operating force.

Moreover, the stroke of operating device for operating movable contacts is usually measured within the gas filled vessel during tests before shipment or installation.

However, if an abnormal defacement or deformation occurs in a part of the moving part, it is impossible to detect clearly such abnormal conditions in the moving part. More particularly, in case that a fluid type operating device is utilized for operating movable contacts, a part of the electrical contacts is extremely over-stroked because there are remaining operating forces even after all strokes are moved.

Furthermore, even if the contacts are opened and closed rapidly (vibrated), it is impossible to detect such an abnormal condition because the vessel in which the contacts are mounted is not vibrated.

As a way for resolving this problem, it is effective to detect the operating force to the moving part, i.e. the movable contacts, when the operating device is driven.

Thus, it is proposed that a dynamic strain meter be put on the operating lever within the vessel, but there is the disadvantage that poor work efficiency results because the wire resistance strain gauge has to attach to an exact position in a narrow space and because of the work of disassembly and assembly for attaching the strain gauge.

Figure 2:
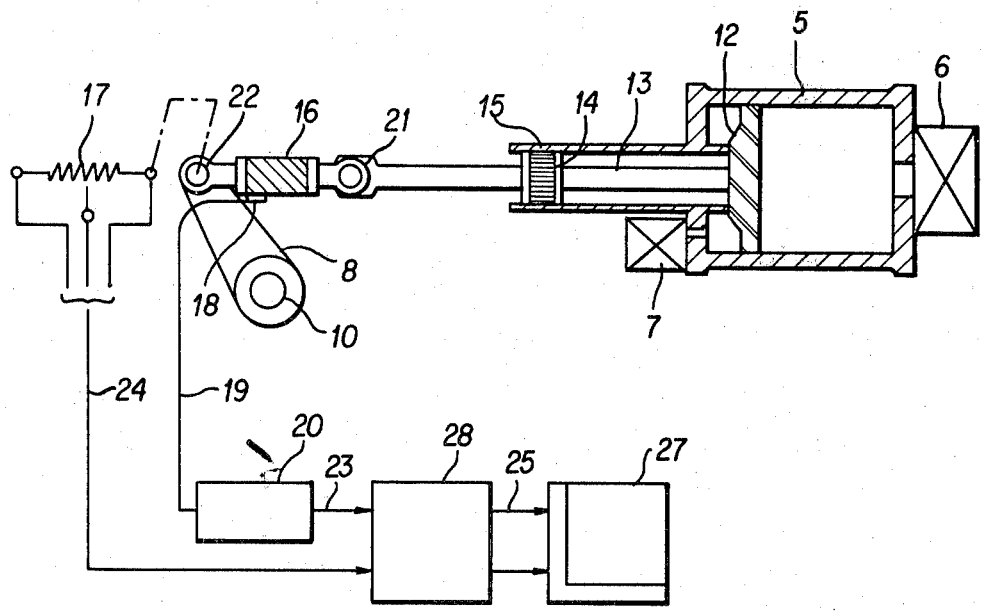
FIG. 2 is a schematic representation of one example of a detecting apparatus according to this invention.

Turning now to a preferred embodiment of this invention shown in FIG. 2, a link 16 including a load cell for detecting the operating force to be applied from the operating cylinder 5 to the circuit breaker is mounted between lever 8 and cylinder 5 in place of rod 11.

A rod 13 connected with a piston 12 within the operating cylinder 5 is supported within a guide cylinder 15 through a guide member 14.

The end of rod 13 is connected to a one end of link 16 via a pin 21 and another end of link 16 is connected to a pin 22 mounted on lever 8.

A terminal 18 connected to an output terminal of a load cell, for instance, wire resistance strain gauge is connected to a lead wire 19, but the terminal 18 is plugged by a water resistant cap when the load cell is not used.

A potentiometer 17, which produces an output 24, is associated with lever 8 via the pin 22 to detect the operation of the circuit breaker, i.e. a stroke thereof. Since a power supply and balancing circuit used for the potentiometer 17 are well known, explanation thereof is omitted.

The lead wire 19 from the load cell is connected to an amplifier or conventional dynamic strain meter 20 which amplifies the electrical signal from the load cell and produces an electrical output 23.

A conventional data recorder 28 which can adjust or change the playback time records the output 23 from amplifier 20 in accordance with a stroke signal 24 from potentiometer 17. A X-Y (rectangular coordinates) recorder 27 is connected to the data recorder 28 to display signals 25 and 26 from the data recorder 28 for comparing data previously obtained under a state in which there is no abnormal condition.

In FIG. 2, the circuit breaker 2 is operated by operating device (5, 6, 7 and 12) at regular speed and at the same time the electric signal representing the operating force from the load cell mounted within link 16 is simultaneously detected, amplified by amplifier 20 and then recorded by data recorder 28. The data once recorded in data recorder 28 are read out or play backed at a speed lower than a normal high speed or regular speed by changing the speed rate. Since the operation of the switch gear, i.e. circuit breaker is rapidly completed, the detected data has to expand or spread in time to provide visible data for evaluation.

Thus, data expanded in time is displayed by the X-Y recorder 27 with the stroke signal 26 also expanded in time for comparing data under a state in which there is no abnormal condition.

Figure 3:
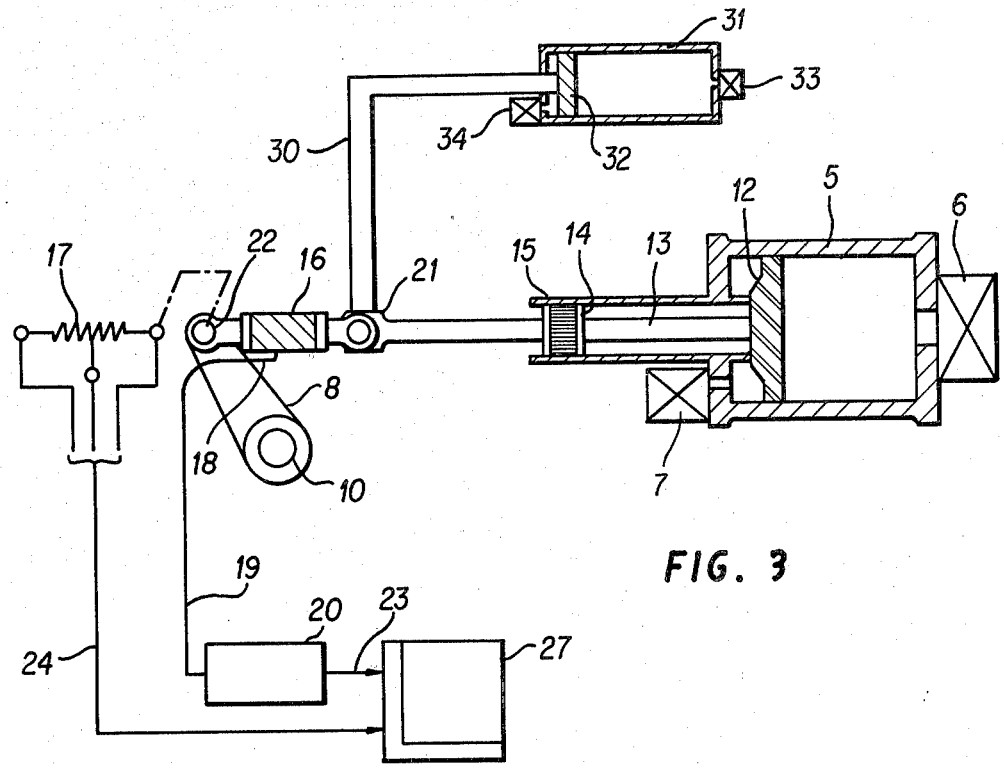
FIG. 3 is a schematic representation of another example of the detecting apparatus according to this invention; and, FIGS. 4, 5 and 6 are graphs showing data detected with the method and apparatus according to this invention.

Referring now to another embodiment of this invention shown in FIG. 3, there is added an additional operating device for operating the switch gear at a low speed compared with the regular speed. The additional operating device includes an L-shaped member 30 connected to the end of rod 13, a cylinder 31 and a piston 32 connected to L-shaped member 30. At respective ends of cylinder 31, a low speed drive valve 33 used for tripping the circuit breaker and a low speed drive valve 34 used for closing the circuit breaker are mounted. In addition, the two operating devices can individually be operated. That is to say, when one operating device is operated, another operating device is free.

Where the movable contact of the circuit breaker is to be moved at an extremely low speed, the additional operating device can be omitted.

In FIG. 3, when the circuit breaker is operated by the additional operating device at a low speed, the operating force to be applied to the circuit breaker is coupled to X-Y recorder 27 through amplifier 20 as a visible analyzable data in accordance with the movement of stroke i.e. stroke signal from potentiometer 17. Thus, it is possible by using the low speed operating device to dispense with time base changing equipment, such as the recorder 28 shown in FIG. 2.

The operation of the detection apparatus of this invention will now be described with reference to FIGS. 4, 5 and 6. These figures show data obtained from detection apparatus shown in FIG. 3.

Figure 4:
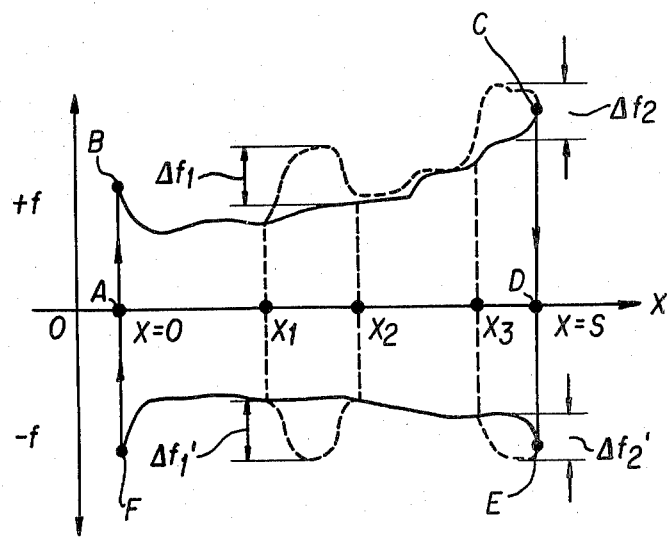

FIG. 4 shows one datum of operating force detected by link 16 built in a load cell when the circuit breaker is tripped and closed by the additional operating device shown in FIG. 3. In FIGS. 4, 5 and 7, the abscissa represents the stroke, while the ordinate represents the operating force.

When the circuit breaker provides a round stroke by operating the additional operating device under a state in which there is no abnormal condition, the curve of the operating force to the stroke traces the curve $(A \rightarrow B \rightarrow C \rightarrow D \rightarrow E \rightarrow F \rightarrow A)$.

On the other hand, the dotted curves in strokes $X_1$ to $X_2$ and $X_3$ to $X(S)$ show that the increased operating forces $\Delta f_1$, $\Delta f_1'$, $\Delta f_2$ and $\Delta f_2'$ are present respectively. Thus, the portions having a large friction, for instance due to lack of lubricating oil, can be detected.

Figure 5:
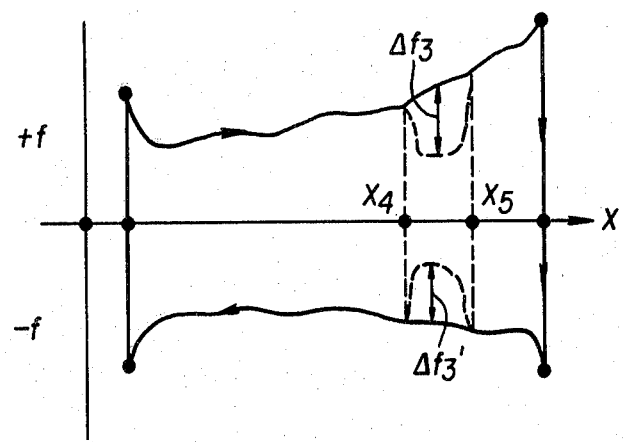

In FIG. 5, the dotted curves in stroke $X_4$ and $X_5$ show that the decreased operating forces $\Delta f_3$ and $\Delta f_3'$ are present. The decreased forces indicate defacing of the contacts by arcing current, that is to say, it shows that the dimension of the contacts is decreased.

Figure 6:
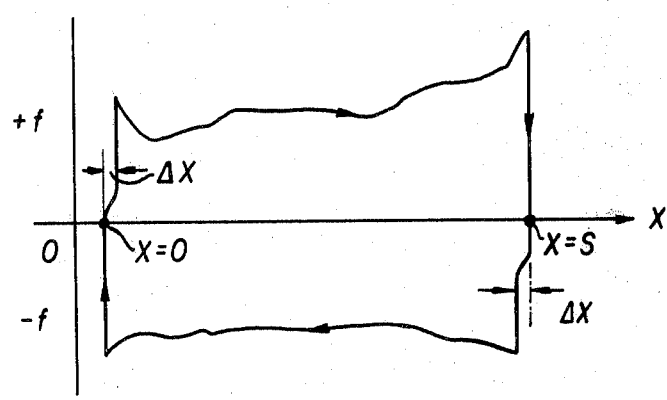

Referring to FIG. 6, the stroke operating force is nearly zero, but in the return stroke the operating force is shifted from the starting point by $\Delta X$. In this case, $\Delta X$ shows that some discrepancy or aberration within the pin portion for combining levers or pin 10 has occurred.

It should now be apparent that in accordance with the teachings of the present invention, it is possible to easily detect abnormal conditions, which occurs within the switch gear, at an earlier stage before the condition reaches a serious state by directly detecting the operating force for driving the switch gear by the operating device.

In other words, it is possible to detect faults or mechanical faults within the switch gear from outside without disassembling the switch gear before such faults become serious.

Moreover, as described above in the description of the construction of the load cell, since the link 16 including the load cell is readily detachable it is possible to easily mount the link 16 to the switch gear already installed without changing the mechanism of the switch gear.

It is also possible to reduce measurement taking time because there is no need to prepare the strain gauge for attachment to the lever.

Furthermore, since the load cell can be previously calibrated with high accuracy, it is possible to obtain accurate measured results in accordance with the present invention.

Obviously, many modifications and variations of the present invention are possible in light of the above teachings.

Thus, although the invention has been explained in FIG. 1 by way of example with a combination of data recorder 28 and X-Y recorder 27 for displaying data, it should be apparent that if desired a synchroscope with an outer sweeping function could be substituted therefore.

It is therefore to be understood that within the scope of the appended claims, the invention may be practiced otherwise than as specifically described herein.

What is claimed as new and desired to be secured by Letters Patent of the United States is:

1. A method of detecting an abnormal condition of a switch gear device operated by means of an actuating device, comprising:
connecting a means for detecting force to a portion between the switch gear device and the actuating device;
driving a movable portion of the switch gear device by the actuating device;
concurrently detecting the driving force and providing an output from the detecting means indicative of the detected force;
recording the measured output from the detecting means; and
comparing the recorded detected output from the detecting means with a recorded output obtained in a normal operating state.

2. A method as recited in claim 1, wherein said step of comparing includes:
varying the read out time of the recorded measured output.

3. The method as recited in claim 2 further comprising:
using a strain gauge as the detecting means.

4. The method as recited in claim 1, further comprising:
said detecting and recording performed concurrently.

5. A method of detecting an abnormal condition of a switch gear device normally operated at a high speed by an actuating device, comprising:
connecting a detecting means for measuring force to a portion between the switch gear and the actuating device;
driving the switch gear device at a normal high speed;
measuring a plurality of data relating to operating force during normal high speed driving;
driving the switch gear device at a lower than normal speed;
concurrently measuring a plurality of examination data relating to the operating force at the time of said low speed driving; and
comparing measured examination data obtained during said steps of normal speed and lower speed driving.

6. An apparatus for detecting an abnormal condition of a switch gear device including a movable contact contained in a sealed casing filled with insulating gas and driven by an actuating mechanism for actuating the movable contact with a predetermined drive force, said apparatus comprising:
a detecting unit mounted between the movable contact and the actuating mechanism for detecting and measuring drive force;
recording means coupled to said detecting unit for recording an output, indicative of drive force, of said detecting unit upon actuation of said switch gear by said actuating mechanism;
said recording means including means for reading out data at a slow speed; and
displaying means coupled to said recording means for displaying recorded data for analysis.

7. An apparatus for detecting an abnormal condition of a switch gear device including a movable contact contained in a sealed casing and driven by an actuating mechanism for actuating the movable contact at a normal speed, said apparatus comprising:
a detecting unit mounted between the movable contact and the actuating mechanism for detecting and measuring drive force;
auxiliary driving means coupled to said movable contact for driving said movable contact at a speed lower than said normal speed; and
displaying means coupled to said detecting unit for displaying an output indicative of drive force from the detecting unit for analysis.

8. An apparatus according to claims 6 or 7, wherein the detecting unit is detachable from the switch gear device.

9. An apparatus according to claims 6 or 7, wherein the detecting unit is mounted outside of the sealed casing.

10. An apparatus according to claim 6 or 7, wherein the detecting unit includes a strain gauge.

* * * * *